March 15, 1932.   E. R. BOLLER   1,849,703
FERTILIZER MANUFACTURE
Filed Oct. 31, 1930
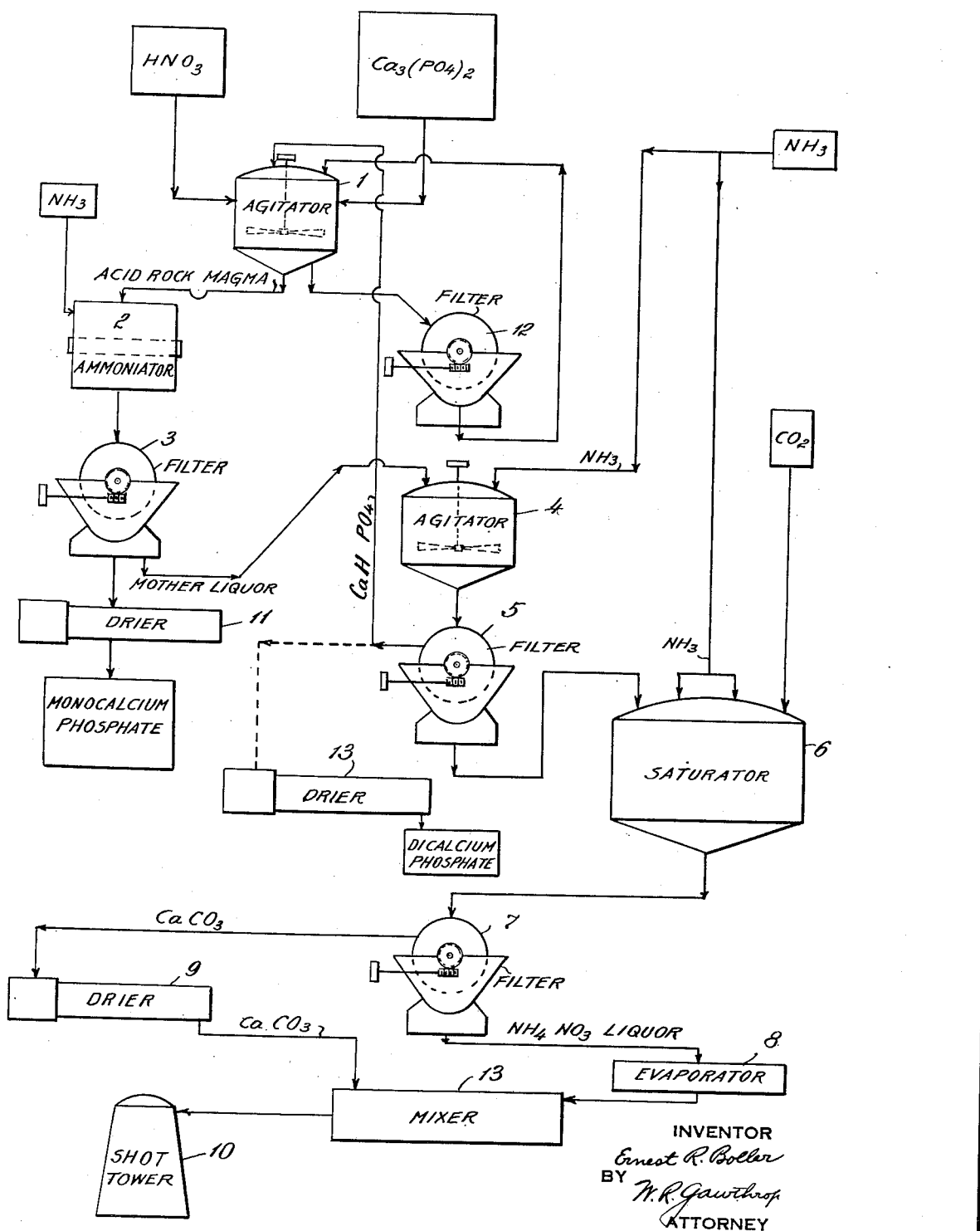

Patented Mar. 15, 1932

1,849,703

UNITED STATES PATENT OFFICE

ERNEST R. BOLLER, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

FERTILIZER MANUFACTURE

Application filed October 31, 1930. Serial No. 492,404.

This invention relates to fertilizers and more particularly to phosphatic and nitrogenated fertilizers and methods for the manufacture thereof.

It is well known that phosphorus, nitrogen and potassium are essential for the propagation, growth, and development of plants. It is also known that in some cases calcium may be assimilated by plants and is otherwise beneficial to plant life. Various compounds of the above named elements are employed as fertilizers. For example, calcium carbonate is of recognized high value in sweetening soils or eliminating soil acidity. Of the phosphatic fertilizers, monocalcium phosphate, normally designated by the formula $CaH_4(PO_4)_2 \cdot H_2O$ or $CaH_4(PO_4)_2$, and dicalcium phosphate, normally designated by the formula $CaHPO_4$, are widely used either as such or in fertilizer mixtures. Thus, triple superphosphate, the reaction product of phosphate rock and phosphoric acid, is largely monocalcium phosphate. Fertilizers of this type are very desirable because substantially all of the $P_2O_5$ contained therein is water soluble and hence readily available for plant consumption. Of the nitrogenated fertilizers, those containing ammonium nitrate and calcium carbonate are well adapted to fertilizing purposes particularly when applied to soils of relatively high acidity.

It is the object of the present invention to provide a new and improved process for producing phosphatic and nitrogenated fertilizers of the type above referred to.

It is a further object of the invention to produce monocalcium phosphate and dicalcium phosphate and a calcium carbonate-ammonium nitrate fertilizer from nitric acid and tricalcium phosphate $(Ca_3(PO_4)_2)$.

Additional objects and advantages of the invention will be apparent as it is more fully understood by reference to the following specification and to the accompanying drawing in which the figure is a diagrammatic representation of an arrangement of apparatus suitable for the practice of the invention.

My researches have shown that the problem of the practical production of monocalcium and dicalcium phosphates as referred to is dependent upon not one but a number of important factors and conditions without proper regard for which uneconomical results are obtained. My invention accordingly embodies a new method of operation involving a combination of certain specific and detailed conditions by virtue of observing which the practical and economical production of monocalcium and dicalcium phosphate is made possible.

I have found that monocalcium phosphate can be produced efficiently by gradually adding phosphate rock to nitric acid and reacting the magma so obtained with ammonia until the phosphoric acid concentration in the solution falls to a certain value.

I have discovered specifically that the maximum yield of monocalcium phosphate is governed by the phosphoric acid concentration in the solution at the transition point between mono- and dicalcium phosphate in this system, there being for a given temperature a definite concentration of phosphoric acid below which monocalcium phosphate will not precipitate, or, in other words, ceases to be the stable solid phase. This point will hereinafter be called the transition point and may be regarded as the composition of the solution with which both mono- and dicalcium phosphate are in equilibrium. With saturated solutions having a higher phosphoric acid concentration monocalcium phosphate is the stable solid phase and with those having a lower phosphoric acid concentration dicalcium phosphate is the stable solid phase.

The efficient production of monocalcium phosphate depends, furthermore, upon separating the solid phase of monocalcium phosphate when the phosphoric acid concentration of the mother liquor is just above the transition point. The phosphoric acid concentration for this transition point is influenced by the calcium nitrate concentration and by the temperature of the system. Within the preferred operating range, i. e. at temperatures of 30° to 75° C. and with an original nitric acid concentration of 40% to 60%, corresponding to a calcium nitrate concentration of 95 to 215 mols per 1000 mols $H_2O$ in the acid-rock reaction magma, the transition point varies from 10 to 35 mols $H_3PO_4$ per 1000 mols $H_2O$. Thus, for example, I have found that when at 40° C. the calcium nitrate concentration in the system varies from 0 mols to 205 mols $Ca(NO_3)_2$ per 1000 mols $H_2O$ (the saturation concentration for calcium nitrate), the transition point decreases from 96 mols to about 8.5 mols $H_3PO_4$ per 1000 mols $H_2O$. Furthermore, in a system prepared from phosphate rock and 50% nitric acid, with a calcium nitrate concentration of about 130 mols $Ca(NO_3)_2$ per 1000, the transition point varies from 15–20 mols $H_3PO_4$ per 1000 mols $H_2O$ at 30° C. to 30–35 mols $H_3PO_4$ per 1000 mols $H_2O$ at 75° C.

My investigations have shown that the concentrations of the reactants and the reaction mixture at certain stages in the production of mono- and dicalcium phosphate by reaction of phosphate rock and nitric acid and addition of ammonia to the resultant magma has an important bearing on the character of the results obtained. Thus, I have observed that unless relatively concentrated nitric acid, for example, of a strength of about 40% or better, is employed in decomposing the rock the decomposition will not proceed at a practical rate. On the other hand, when such relatively concentrated acid is employed as is, for the practical reasons indicated, required, the resultant magma is of such a physical character that the handling and treatment thereof in subsequent operations of the process is very difficult and upon reaction of ammonia therewith an undesirably high percentage of unavailable or citrate insoluble $P_2O_5$ is recovered in association with dicalcium phosphate. I have found, however, that these difficulties are obviated if the phosphate rock is decomposed with relatively concentrated nitric acid and the mother liquor separated from the monocalcium phosphate thus produced is diluted before precipitation of dicalcium phosphate by ammoniation. As a diluting agent water may be employed or suitable aqueous solutions, especially solutions containing one or more of the intermediate products of the process, as, for example, calcium nitrate and ammonium nitrate. Preferably I employ, as a diluting agent, a portion of the ammonium nitrate or ammonium nitrate-calcium nitrate liquor produced in subsequent stages of the process more fully referred to hereinafter.

When operating in this manner I have found that the phosphate rock-nitric acid magma can be handled without any difficulty and that a di-calcium phosphate can readily be obtained containing less than 1% citrate insoluble $P_2O_5$, whereas, when no diluting agent is added prior to the ammoniation, the product contains 10–15% citrate insoluble $P_2O_5$.

I have also found, apart from the conditions just stated, improved results are secured in the production of mono- and dicalcium phosphate by ammoniating the mother liquor remaining after the decomposition of phosphate rock and separation of monocalcium phosphate formed with a gaseous mixture of ammonia and an inert gas and, further, in accomplishing the ammoniation by forcing said gaseous mixture into the air-filled space above the level of the agitated magma contained in a closed vessel. In this way a product is obtained containing only 0.25% citrate insoluble $P_2O_5$, whereas, otherwise, e. g. by bubbling ammonia alone through the magma, a product will result which contains citrate insoluble material to the extent of 1.5% or more.

I have found further that the unavailable or citrate insoluble $P_2O_5$ in the product obtained is decreased by ammoniating the mother liquor remaining after separation of the monocalcium phosphate from the phosphate rock-nitric acid magma while adding a small amount of a soluble silicate, e. g. sodium silicate, to the acid-rock magma before or during ammoniation, but preferably when the ammoniation is approximately one-half completed. Thus, for example, a product will be obtained which contains 2.8% citrate insoluble $P_2O_5$ while under like conditions without the use of sodium silicate 5.9% of the total product will be citrate insoluble $P_2O_5$.

As a further element of my invention I have discovered that improved results are secured in the first step, i. e. the decomposing of phosphate rock with nitric acid, by adding the rock to the acid. This manner of operation is generally desirable to obtain the full benefit of the action of acid on rock from the inception of the operation, since thereby a more efficient and rapid dissolution of the rock is obtained than when the acid is added to the rock. I have found, moreover, that by gradually adding the rock until just before precipitation of monocalcium phosphate, filtering off the gangue and adding the remainder of the rock, approximately 90% of the insoluble non-phosphatic material otherwise remaining in the product will be eliminated.

While the conditions above set forth are independently of importance, they may advantageously be used in combination one with another and I have in fact found the best results to be obtained when all the various conditions mentioned are observed.

According to a preferred embodiment of the invention, monocalcium phosphate is produced by a continuous cyclic process and a valuable nitrogenated fertilizer is recovered as one of the by-products thereof. For the sake of convenience the process may be described with reference to three principal steps as follows: (I) Phosphate rock and, if desired, dicalcium phosphate from stage II hereinafter described, are reacted with nitric acid and the resultant mixture treated with a small amount of ammonia to give a magma containing essentially, monocalcium phosphate suspended in a solution of calcium nitrate, ammonium nitrate and phosphoric acid. This magma is filtered. (II) The mother liquor from stage (I) is treated with ammonia, giving a precipitate of dicalcium phosphate in a solution of calcium and ammonium nitrates. This is also filtered. (III) The mother liquor from stage II is treated with ammonia and carbon dioxide, precipitating calcium carbonate in a solution of ammonium nitrate.

These steps are followed in the order given and, broadly speaking, are preferably effected in detail as follows:

(I) Phosphate rock is gradually added to and dissolved in nitric acid and agitated until the reaction is complete, the time required for the reaction depending upon the amount of the rock added. The desired amount of dicalcium phosphate from stage II of a preceding cycle is then added slowly and the reaction goes to completion at a temperature of 30° C. or lower. Ammonia is then passed into the magma until the phosphoric acid concentration falls to about 20 mols $H_3PO_4$ per 1000 mols $H_2O$ and monocalcium phosphate is precipitated.

A preferred variation of the procedure is, as before stated, on the addition of phosphate rock to nitric acid, to separate the acid insoluble residue of the rock from the solution of calcium nitrate and phosphoric acid before precipitation of monocalcium phosphate begins. The remainder of the rock and/or the dicalcium phosphate is added to the clear solution and the magma treated as above described in stage I. This variation produces a more concentrated product and one more easily filtered and handled.

(II) the mother liquor from stage I, is treated with ammonia to precipitate dicalcium phosphate, for example, by forcing ammonia gas into the closed air-filled space above the acid-rock magma so that an atmosphere with a small partial pressure of ammonia is maintained, and the magma agitated sufficiently violently to keep its surface broken. Dicalcium phosphate is precipitated, removed from the system, or returned to step I for reaction with nitric acid to form monocalcium phosphate. The return of the dicalcium phosphate produced in this step is cyclic and if all the dicalcium phosphate is returned the production of monocalcium phosphate is equivalent to the phosphate rock used.

(III) The mother liquor from stage II, containing essentially calcium and ammonium nitrates, is treated in a suitable apparatus with ammonia and carbon dioxide whereby all calcium is precipitated as calcium carbonate, and a solution of ammonium nitrate is left as the end liquor. In this step the ammonia and carbon dioxide may be either added to the liquor simultaneously or the required amount of ammonia may be dissolved in the liquor and the carbon dioxide then added. Either pure carbon dioxide or any mixture of carbon dioxide with an inert gas, such as air may be employed, or the ammonia and carbon dioxide may be replaced wholly or in part by a compound such as ammonium carbonate, ammonium bicarbonate, or ammonium carbamate.

Although the invention is susceptible of considerable variation and modification in the manner of its practical application, particularly as regards proportions of materials, apparatus, and specific conditions of operation the following examples will serve to indicate how the invention may be practiced.

Referring to the drawings the principal operations of stages I and II are carried out in agitator I and ammoniator II, respectively. Stage III is largely effected in saturator 3. The nature and functions of the apparatus parts are indicated by legends and will be set forth below.

In the following examples Florida land pebble rock phosphate, analyzing 32.23% $P_2O_5$ and 46.87% CaO, was used. The accompanying equations illustrate both the reactions and concentrations involved in various steps of the process and the formula $4Ca_3(PO_4)_2.3CaO$ is taken as representing the phosphatic material of the rock, as it expresses very well its $P_2O_5$ content and its acid consuming capacity.

*Example 1*

I. Referring to the drawing, 92 parts of Florida rock were added in agitator 1 to 200 parts of 50% $HNO_3$ and the magma agitated one hour at 30° C. to allow the reaction to reach completion. Thereafter 24.2 parts of dicalcium phosphate from filter 5 (stage II of a preceding cycle) were added to the mixture. The reaction may be represented as:

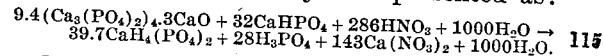

To the magma resulting from stage I above, approximately 0.8 parts of ammonia were added in ammoniator 2, reducing the phosphoric acid concentration to about 20 mols $H_3PO_4$ per 1000 mols $H_2O$ as illustrated by the following equations:

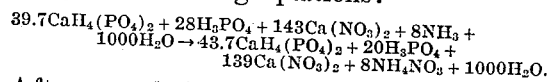

After completion of the reaction 37.7 mols $CaH_4(PO_4)_2$, equivalent to 49 parts of monocalcium phosphate, in filter 3, were separated, leaving 6 mols of $CaH_4(PO_4)_2$ remaining in solution. In the following consideration it is assumed the separation of monocalcium phosphate was complete.

II. The resultant mother liquor was treated with 4.9 parts of ammonia in agitator 4, the reaction being stopped when the magma just failed to turn butter yellow (benzene-azo-dimethylaniline) indicator pink. The reaction may be represented as follows:

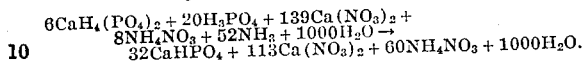
$$6CaH_4(PO_4)_2 + 20H_3PO_4 + 139Ca(NO_3)_2 + 8NH_4NO_3 + 52NH_3 + 1000H_2O \rightarrow$$
$$32CaHPO_4 + 113Ca(NO_3)_2 + 60NH_4NO_3 + 1000H_2O.$$

Although not indicated in the above equation, there is, at this point, a small amount of phosphoric acid remaining in solution.

Although the dicalcium phosphate need not be washed and dried when returned to the process, inasmuch as this changes slightly the composition of the solutions at various stages of the process, and reduces slightly the yield of monocalcium phosphate, the 24.2 parts of dicalcium phosphate were separated from the mother liquor by means of filter 5, washed, dried, and returned to agitator 1 in the first step of a succeeding cycle of the process. Complete displacement washing, as above stated, is assumed in the description of the following step of the process.

III. The calcium-ammonium nitrate solution from stage II was treated in saturator 6 with 21.3 parts of ammonia and 27.6 parts of carbon dioxide, as may be represented by the equation:

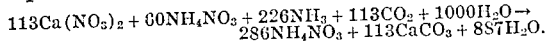
$$113Ca(NO_3)_2 + 60NH_4NO_3 + 226NH_3 + 113CO_2 + 1000H_2O \rightarrow$$
$$286NH_4NO_3 + 113CaCO_3 + 887H_2O.$$

The precipitate of calcium carbonate was separated from the mother liquor in filter 7, leaving a solution containing 127 parts of ammonium nitrate.

*Example 2*

I. Referring to the drawing, 110 parts of Florida rock were added to 200 parts of 50% $HNO_3$ in agitator 1 and the mixture thoroughly agitated for four hours at 30° C. to allow complete decomposition of the rock. The reaction may be represented by the equation:

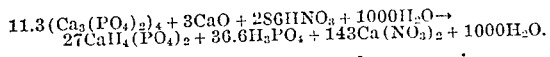
$$11.3(Ca_3(PO_4)_2)_4 + 3CaO + 286HNO_3 + 1000H_2O \rightarrow$$
$$27CaH_4(PO_4)_2 + 36.6H_3PO_4 + 143Ca(NO_3)_2 + 1000H_2O.$$

Approximately 1.6 parts of ammonia were then added to the magma in ammoniator 2, reducing the phosphoric acid concentration to a value near the transition point; as illustrated by the following equation:

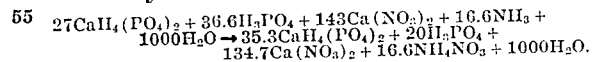
$$27CaH_4(PO_4)_2 + 36.6H_3PO_4 + 143Ca(NO_3)_2 + 16.6NH_3 + 1000H_2O \rightarrow 35.3CaH_4(PO_4)_2 + 20H_3PO_4 +$$
$$134.7Ca(NO_3)_2 + 16.6NH_4NO_3 + 1000H_2O.$$

At this point 29.3 mols $CaH_4(PO_4)_2$, equivalent to 38 parts of monocalcium phosphate, were precipitated and removed by filter 3, 6 mols remaining in solution.

II. The solution resulting from step I above was treated in agitator 4 with approximately 4.9 parts of ammonia, thereby precipitating dicalcium phosphate, the ammonia addition being stopped when the magma just failed to turn butter yellow indicator pink. The reaction may be described by the following equation, it being assumed that the mother liquor was completely separated from the precipitated monocalcium phosphate of the preceding reaction:

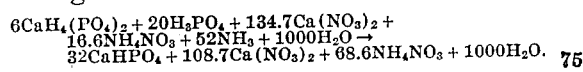
$$6CaH_4(PO_4)_2 + 20H_3PO_4 + 134.7Ca(NO_3)_2 + 16.6NH_4NO_3 + 52NH_3 + 1000H_2O \rightarrow$$
$$32CaHPO_4 + 108.7Ca(NO_3)_2 + 68.6NH_4NO_3 + 1000H_2O.$$

The small quantity of phosphate remaining in solution is not shown in this equation. The 24.2 parts of dicalcium phosphate were separated from the mother liquor in filter 5, washed and dried, in drier 13.

III. Complete displacement washing is assumed in stage II above and the calcium-ammonium nitrate mother liquor was treated with 20.5 parts of ammonia and 26.6 parts of carbon dioxide in saturator 6 as represented in the equation:

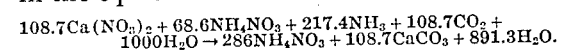
$$108.7Ca(NO_3)_2 + 68.6NH_4NO_3 + 217.4NH_3 + 108.7CO_2 + 1000H_2O \rightarrow 286NH_4NO_3 + 108.7CaCO_3 + 891.3H_2O.$$

The calcium carbonate was separated from the solution in filter 7, leaving a mother liquor which contained 127 parts of ammonium nitrate.

In either Examples 1 or 2 the calcium carbonate of stage III is separated from the ammonium nitrate liquor which latter is then concentrated by evaporation in evaporator 8. Thereafter the calcium carbonate is mixed in mixer 13 with preferably not more than two-thirds of the concentrated ammonium nitrate liquor and the mixture is granulated in any suitable manner, such as, for example, stirring while hot or by shotting in a heated tower 10. The finished product, containing ammonium nitrate and calcium carbonate is well adapted physically and chemically to the fertilizer requirements of storage, shipment and distribution.

Various changes may be made in the method described without departing from the invention or sacrificing any of the advantages thereof.

I claim:

1. A cyclic process for the production of monocalcium phosphate which comprises a combination of the following steps: (1) reacting tricalcium phosphate and dicalcium phosphate with nitric acid; (2) adding sufficient ammonia to the resultant magma to effect substantially complete precipitation of monocalcium phosphate with little or no dicalcium phosphate; (3) separating the monocalcium phosphate from the residual liquor; (4) adding further ammonia to the residual liquor thereby precipitating dicalcium phosphate; and (5) utilizing at least a part of the dicalcium phosphate so produced for reaction with further portions of tricalcium phosphate and nitric acid in step 1.

2. A process for the production of fertilizers which comprises in combination the following steps: (1) reacting nitric acid and phosphate rock; (2) diluting the resultant magma; (3) adding ammonia thereto; (4) separating therefrom the monocalcium phosphate formed; (5) utilizing a part of the residual liquor as the diluting agent in step (2); (6) adding ammonia to another part of said residual liquor; (7) separating therefrom the dicalcium phosphate formed and returning it to step (1); (8) reacting the resultant liquor from step (7) with ammonia and carbon dioxide; (9) separating the thus precipitated calcium carbonate; (10) concentrating the resultant ammonium nitrate with the calcium carbonate of step (9); and (12) granulating the mixture.

3. A process for the production of fertilizers which comprises the following steps: (1) reacting nitric acid and phosphate rock; (2) diluting the resultant magma; (3) adding ammonia thereto; (4) separating therefrom the monocalcium phosphate formed; (5) utilizing a part of the residual liquor as the diluting agent in step (2); (6) adding ammonia to another part of said residual liquor; (7) separating therefrom the dicalcium phosphate formed; (8) reacting the resultant liquor from step (7) with ammonia and carbon dioxide; (9) separating the thus precipitated calcium carbonate; (10) concentrating the resultant ammonium nitrate liquor; (11) mixing the concentrated ammonium nitrate with the calcium carbonate of step (9); and (12) granulating the mixture.

4. A process for the production of monocalcium phosphate by decomposition of phosphate rock with nitric acid followed by ammoniation of the resultant magma and separation of monocalcium phosphate therefrom, characterized by the fact that nitric acid of 40 to 60% strength is used, that the ammoniation is effected at a temperature within the range of 30–75° C. and sufficient ammonia is added to the magma to produce therein a phosphoric acid concentration within the range of 10 mols to 35 mols $H_3PO_4$ per 1000 mols $H_2O$.

5. The process which comprises gradually adding phosphate rock to nitric acid to a point just before precipitation of monocalcium phosphate, filtering off the insoluble residue, adding more rock to the acid and contacting the resultant magma with ammonia.

6. The process which comprises reacting phosphate rock and relatively concentrated nitric acid, contacting the resultant magma with ammonia, and adding a soluble silicate after ammoniation is one-half completed.

7. The process which comprises gradually adding phosphate rock to relatively concentrated nitric acid to a point just before precipitation of monocalcium phosphate, filtering off the insoluble residue, adding more rock to the acid, adding a diluting agent, and contacting the resultant magma with ammonia.

8. The process which comprises gradually adding phosphate rock to relatively concentrated nitric acid to a point just before precipitation of monocalcium phosphate, filtering off the insoluble residue, adding more rock to the acid, adding a diluting agent, contacting the resultant magma with diluted ammonia, and adding a soluble silicate after ammoniation is one-half completed.

9. The process which comprises gradually adding phosphate rock to relatively concentrated nitric acid to a point just before precipitation of monocalcium phosphate, filtering off the insoluble residue, adding more rock to the acid, adding a diluting agent, contacting the resultant magma with diluted ammonia until the hydrogen ion concentration corresponding to substantially pH=2 to 3 is obtained, and adding a soluble silicate after ammoniation is one-half completed.

10. The process which comprises gradually adding phosphate rock to relatively concentrated nitric acid to a point just before precipitation of monocalcium phosphate, filtering off the insoluble residue, adding more rock to the acid, adding a diluting agent, forcing gaseous ammonia into the air-filled space above the magma contained in a closed vessel, and adding a soluble silicate after ammoniation is one-half completed.

11. The process which comprises reacting phosphate rock and nitric acid, contacting the resultant magma with diluted ammonia, and adding a soluble silicate after ammoniation is one-half completed.

12. The process which comprises reacting phosphate rock and nitric acid, contacting the resultant magma with diluted ammonia until the hydrogen ion concentration corresponding to substantially pH=2 to 3 is obtained, and adding a soluble silicate after ammoniation is one-half completed.

13. The process which comprises reacting phosphate rock and nitric acid, adding a diluting agent, contacting the resultant magma with diluted ammonia, and adding a soluble silicate after ammoniation is one-half completed.

14. The process which comprises gradually adding phosphate rock to nitric acid to a point just before precipitation of monocalcium phosphate, filtering off the insoluble residue, adding more rock to the acid, and contacting the resultant magma with diluted gaseous ammonia.

15. The process which comprises gradually adding phosphate rock to nitric acid to a point just before precipitation of monocalcium phosphate, filtering off the insoluble residue, adding more rock to the acid, contacting the resultant magma with diluted gaseous ammonia, and adding a soluble silicate after ammoniation is one-half completed.

16. The process which comprises gradually adding phosphate rock to relatively concentrated nitric acid to a point just before precipitation of monocalcium phosphate, filtering off the insoluble residue, adding more rock to the acid, adding a diluting agent, contacting the resultant magma with diluted ammonia until the hydrogen ion concentration corresponding to substantially pH=2 to 3 is obtained, forcing gaseous ammonia into the air filled space above the magma contained in a closed vessel, and adding a soluble silicate after ammoniation is one-half completed.

17. Process which comprises reacting phosphate rock and nitric acid and ammoniating the resultant magma in the presence of a soluble silicate.

18. Process which comprises gradually adding phosphate rock to relatively concentrated nitric acid to a point just before precipitation of monocalcium phosphate, filtering off the insoluble residue, adding more rock to the acid, adding a diluting agent, forcing gaseous ammonia into the air filled space above the magma contained in a closed vessel until a hydrogen ion concentration corresponding to substantially pH=2 to 3 is obtained, and adding a soluble silicate after ammoniation is substantially one-half completed.

In testimony whereof, I affix my signature.

ERNEST R. BOLLER.